G. A. JOHNSON.
FRICTION SHOCK ABSORBING MECHANISM.
APPLICATION FILED FEB. 19, 1919.
1,378,868.
Patented May 24, 1921.
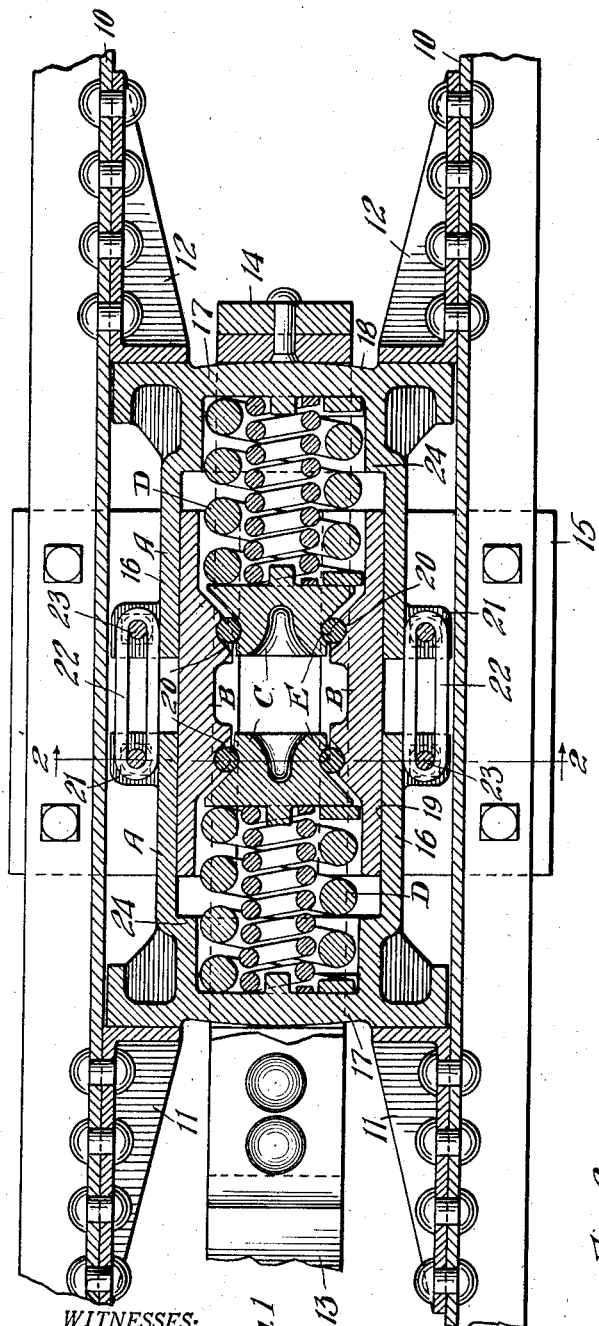
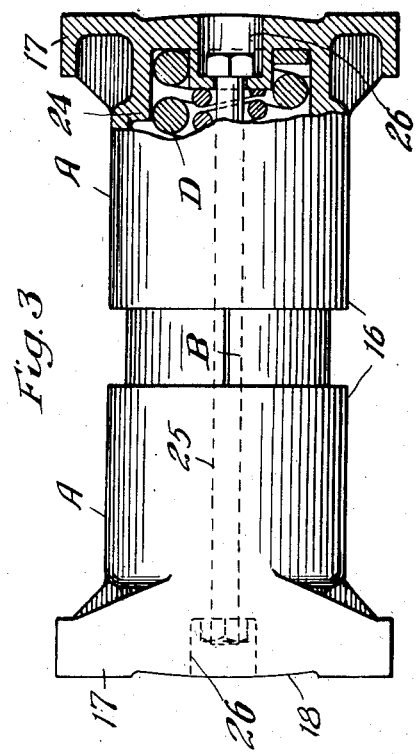
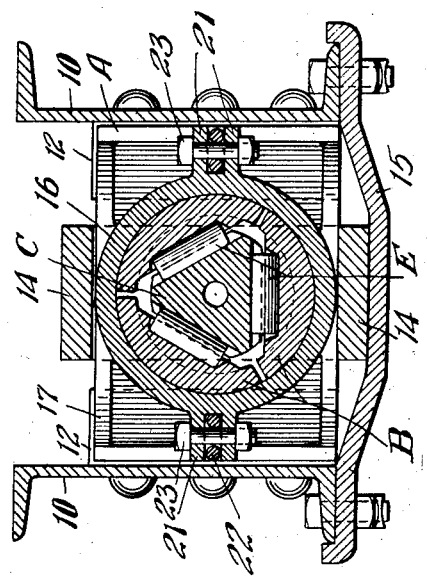
WITNESSES:
INVENTOR.
George A. Johnson
BY George J. Haight
ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

FRICTION SHOCK-ABSORBING MECHANISM.

1,378,868.  Specification of Letters Patent.  Patented May 24, 1921.

Application filed February 19, 1919. Serial No. 277,965.

*To all whom it may concern:*

Be it known that I, GEORGE A. JOHNSON, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism more especially adapted for railway draft riggings and wherein is provided high capacity and unusually large friction wearing areas.

Another object of the invention is to provide a friction shock absorbing mechanism of the character above indicated wherein the contacting friction areas increase as the compressive stroke progresses.

In the drawing forming a part of this specification, Figure 1 is a horizontal longitudinal sectional view of a portion of a railway draft rigging showing my improvements in connection therewith. Fig. 2 is a vertical transverse sectional view taken substantially on the line 2—2 of Fig. 1. And Fig. 3 is a part elevational view part sectional view of the shock absorbing mechanism proper, Fig. 3 illustrating the modification of means for limiting the separating movement of the friction shells.

Referring first to the construction illustrated in Figs. 1 and 2, 10—10 denote channel-shaped center or draft sills of a railway car, to the inner faces of which are secured front stops 11 and rear stops 12, spaced the standard distance apart. A portion of the draw bar is indicated at 13, the same being operatively associated with the shock absorbing mechanism proper by any suitable means—such as the usual strap yoke 14. The shock absorbing mechanism and associated parts are supported in any suitable manner, as by means of the detachable saddle plate 15.

The shock absorbing mechanism proper, as shown, comprises, broadly, two friction shells A—A, a set of friction shoes B, two wedges C—C, two springs D—D and a series of anti-friction rollers E—E interposed between the respective wedges and the friction shoes.

Each friction shell A is formed with a cylindrical friction shell proper 16 and with an integral end wall 17 laterally extended to act as a follower, as clearly shown in Fig. 1. The outer face of the end wall is convex, as indicated at 18, so as to provide rounded bearings for the butt of the draw bar and the rear cross pieces of the yoke to facilitate lateral movement of the yoke and draw bar when cars are passing around curves.

Each friction shoe B, of which there are preferably three, arranged in a circular series, is formed, on its outer face, with a cylindrical friction surface, indicated at 19, and adapted to coöperate with the corresponding interior cylindrical friction surfaces of the two shells A—A. On its inner face, each shoe B is provided with oppositely arranged wedge-acting roller-bearing seats, as indicated at 20—20. Said seats are shouldered in the usual manner to accommodate the anti-friction rollers E which are interposed between the shoes and the two oppositely arranged wedges C—C. As will be clear from an inspection of Fig. 1, the wedges C are interposed between the friction shoes and the springs D, the springs D being compressed between the wedges C and the end walls 17 of the friction shells.

The shells A—A are normally separated a distance corresponding to the permissible action of the mechanism. To hold the shock absorbing mechanism in assembled relation and to facilitate insertion of the mechanism between the sills, I preferably provide the following means: Each shell A is provided on each side thereof with laterally-extended spaced perforated lugs 21—21, adapted to receive therebetween links 22. Bolts 23 are passed through the perforated lugs 21 and through the links 22 so that separation of the shells A—A is limited, as will be obvious.

In operation, and assuming inward movement of the draw bar, it is evident that the outer shell A will be forced rearwardly toward the rear shell A, which is held by the rear stops 12. As this action progresses, the friction shoes B telescope farther and farther within the two shells A, thus gradually increasing the amount of friction area between the shoes and shells, the maximum amount being obtained when the mechanism has been fully compressed. The friction is, of course, gradually increased, due to the compression of the springs D acting through the wedges C and anti-friction rollers E against the shoes B. In order to limit the action of the friction shells and prevent over-compression of the springs, the shells may be provided, on their interior, with annular shoulders, as indicated at 24, adapted to be engaged by the friction shoes B when the latter have moved within either shell the maximum permissible amount. The shoulders 24 will preferably be so located as to come in contact with the opposed ends of the friction shoes B at the same time that the opposed inner ends of the shells A—A come into contact. The release will be effected in a well-known manner due to the expansion of springs when pressure from the draw bar is removed.

Referring to the construction shown in Fig. 3, all the parts thereof are substantially identical with those shown in Figs. 1 and 2, except that I employ a through retaining bolt, indicated at 25, having the head and nut thereof at its ends seated in suitable cup-shaped bosses 26—26 formed in the end walls of the friction shells. The operation of the device shown in Fig. 3 is similar to that of the device shown in Figs. 1 and 2 and need not be repeated.

I claim:

In a friction shock absorbing mechanism, the combination with a pair of opposed, relatively longitudinally movable friction shells each having an interior friction surface extending parallel to the line of relative longitudinal movement, the friction surface of one shell being in alinement with the friction surface of the other shell, said shells being normally separated an amount equal to the permissible stroke of the mechanism; of a set of friction shoes common to both shells, each shoe of the set having an outer surface extending parallel to the said line of relative movement and coöperable with the friction surfaces of both shells, each shoe having also a pair of longitudinally separated wedge faces on its inner side; a wedge associated with each end set of wedge faces of the shoes; a spring interposed between each wedge and the remote end of the corresponding friction shell; and limiting shoulders on the interior of each shell coöperable with the respective adjacent ends of the shoes to limit the inward movements of the latter with respect to both shells, the distance between one set of shoe ends and corresponding shell shoulders being less than the permissible stroke of the mechanism whereby movement of the shoes with respect to both shells is insured during a complete stroke of the mechanism.

In witness that I claim the foregoing I have hereunto subscribed my name this 17th day of Feb. 1919.

GEORGE A. JOHNSON.

Witness:
JOSEPH HARRIS.